United States Patent [19]

Sponheimer et al.

[11] Patent Number: 5,589,589

[45] Date of Patent: Dec. 31, 1996

[54] PROCESS FOR SCREENING CELLULOSE ETHERS

[75] Inventors: Manfred Sponheimer, Wiesbaden; Guenther Welt, Gau-Bischofsheim; Manfred Ziegelmayer, Bischofsheim, all of Germany

[73] Assignee: Hoechst AG, Germany

[21] Appl. No.: 420,070

[22] Filed: Apr. 11, 1995

[30] Foreign Application Priority Data

Apr. 11, 1994 [DE] Germany .......................... 44 12 391.4

[51] Int. Cl.⁶ .......................... C08B 11/20; C08B 11/08
[52] U.S. Cl. .......................... 536/86; 536/88; 536/90; 536/91; 536/95; 536/96; 536/97; 536/98; 536/99; 536/100; 241/28
[58] Field of Search ..................... 536/56, 86, 88, 536/90, 91, 95, 96, 97, 98, 99, 100; 241/28, 69, 70, 98

[56] References Cited

U.S. PATENT DOCUMENTS

| | | | |
|---|---|---|---|
| 2,833,758 | 5/1958 | Köhler et al. | 536/58 |
| 3,572,593 | 3/1971 | Guarisco | 241/24 |
| 4,415,124 | 11/1983 | Carduck et al. | 241/28 |
| 4,681,676 | 7/1987 | Heidinger et al. | 209/380 |
| 4,820,813 | 4/1989 | Schulz | 536/84 |

FOREIGN PATENT DOCUMENTS

| | | |
|---|---|---|
| 0049815 | 4/1982 | European Pat. Off. . |
| 1184611 | 12/1964 | Germany . |

*Primary Examiner*—Nathan M. Nutter
*Attorney, Agent, or Firm*—Connolly & Hutz

[57] ABSTRACT

A process and apparatus for screening cellulose ethers which have a finely fibrous or wad-like or woolly structure, wherein the process comprises the following steps:

a) applying the cellulose ether (material to be screened) to a sieve surface, b) dividing the material to be screened into an screenable portion (acceptable size material or material passing through the sieve) and a circulating portion (oversize material or sieve surface tailings) with the aid of an agitated (preferably vibrating and/or tumbling) sieve surface, c) flushing through the agitated sieve surface from below, generally perpendicularly to the sieve surface, with an air flow, d) discharging (recovering) the acceptable size material, and e) discharging the circulating portion from the sieving system.

The air flow inhibits clogging or plugging of or matting upon the sieve surface and is preferably directed upward by slit nozzles arranged below the sieve surface.

16 Claims, 2 Drawing Sheets

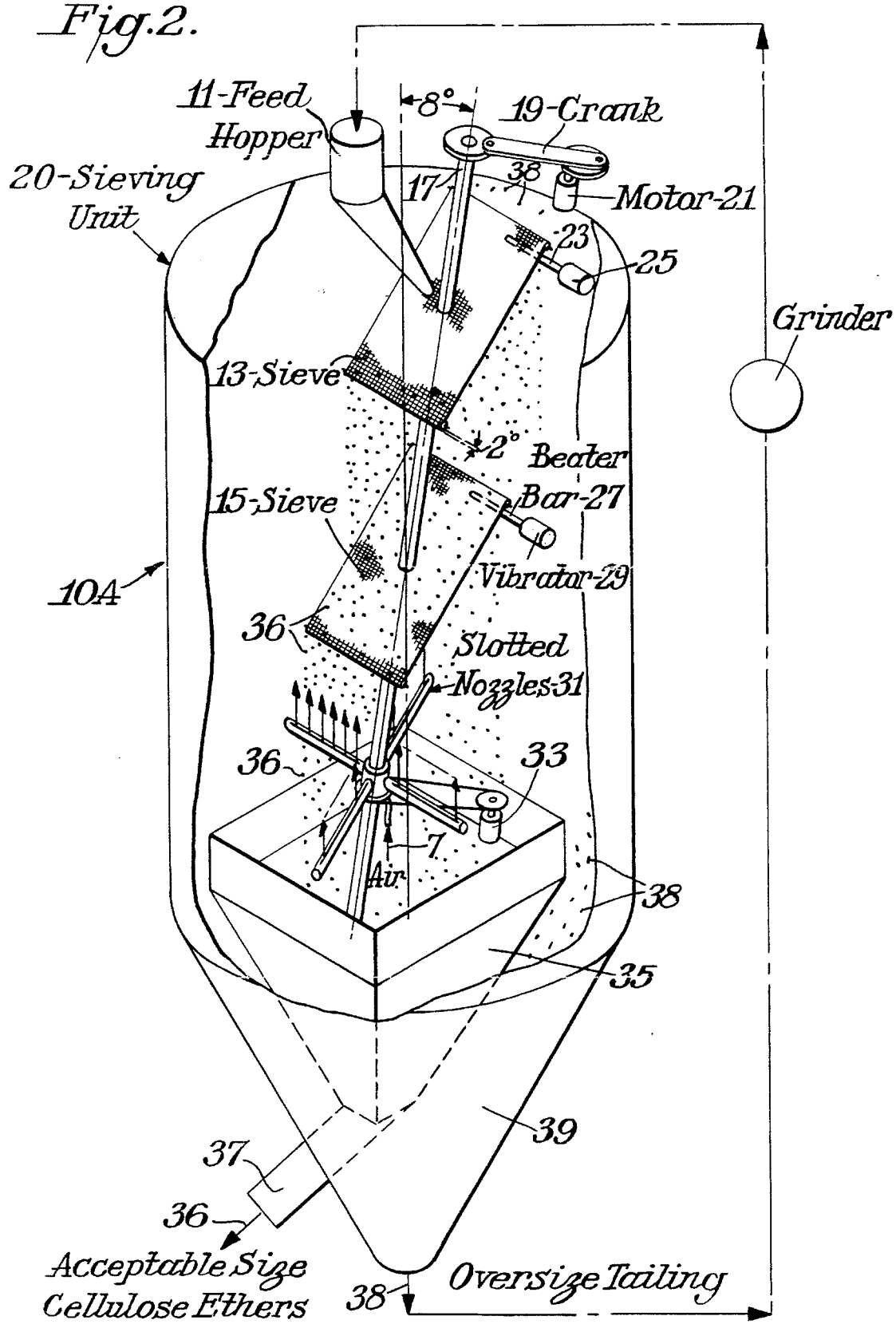

PROCESS FOR SCREENING CELLULOSE ETHERS

FIELD OF THE INVENTION

This invention relates to a method and apparatus for dividing a particulate mass of cellulose ether into relatively fine and relatively coarse fractions.

DESCRIPTION OF THE PRIOR ART

The products arising in the production of cellulose ethers generally have, after removal of byproducts, a predominantly friable, fibrous, woolly or wad-like structure, depending on the degree of etherification and the pulp used.

In this form they are unsuitable for further use, for example as products soluble in organic and/or aqueous media.

For the various areas of use, it is also necessary to establish specified particle size distributions, degrees of drying and viscosity levels. Thus, for example, cellulose ethers are required in finely divided or very finely divided form to enable the rapid production of lump-free solutions, for example in water. For rapidly swellable cellulose ethers, which are required for example in the drilling oil or construction industry, the viscosity distribution and/or the particle size distribution of the products is of decisive importance for their effectiveness. Thus, the cellulose ethers are usually prepared for use after their production by means of known drying, grinding and, if appropriate, screening processes. The grinding and screening of wad-like cellulose ethers is especially likely to encounter great difficulties. Elongated and fibrous particles can be present in the material fed to the screening device, despite size reduction with the known grinding processes, making screening very difficult.

DE-A-24 58 998 discloses that wad-like cellulose ethers can only be ground using certain mills; moreover, screening, because of poor flowability of the material to be ground, is almost impossible.

EP-A-0 049815 relates to a multistage process for producing micropowders from cellulose ethers by which fine and very fine powders can be produced in a simple manner. According to EP-A-0 049 815, cellulose ethers which have a fibrous or wad-like or woolly structure are first converted into a consolidated form and then ground in a jet mill so that the desired grain fineness is achieved.

A disadvantage of this process is the need for a multistage apparatus in order to achieve the desired grain fineness. Furthermore, this discontinuous process is only usable on a laboratory scale for micropowders.

In the known processes for preparing cellulose ethers for use, the sieve tailings are generally fed back to the grinding system and subjected to renewed grinding. The particles of the sieve tailings can therefore pass repeatedly through the grinding system until they are converted to the desired grain shape. Owing to poor separation efficiency on the sieving machine, buildup of the circulated product can frequently not be prevented since a constantly increasing amount of acceptable size grains is contained in the sieve tailings as the operating time increases.

Furthermore, in the processes known from the prior art, the material to be screened is severely mechanically and thermally stressed by the repeated passage through the grinding system, so that in particular in the case of highly viscous, highly substituted cellulose ethers, the macromolecules are broken down in the sense of chain length reduction, which is particularly evident from a certain decrease in viscosity in comparison to the cellulose ether originally used.

However, the processes known from the prior art allow size distribution, flowability and defined bulk density with a low amount of oversize material and high amount of acceptable size material from wad-like, fibrous cellulose ethers.

An objective of this invention is therefore to provide a process for screening cellulose ethers which have a finely fibrous or wad-like or woolly structure, in which the grain size distribution can be specifically adjusted, the bulk density of the cellulose ethers can be increased, the cellulose ether attains a flowability or the existing flowability is improved.

A further objective is to decrease the amount of tailings in such a way that buildup of the material to be screened is prevented.

SUMMARY OF THE INVENTION

The invention relates to a process and apparatus for screening difficult-to-screen cellulose ethers which, when prepared, have a finely fibrous or wad-like or woolly structure and hence, even after drying and/or grinding, comprise elongated particles or fibers.

The process of this invention comprises the following steps:

a) applying or feeding the cellulose ether (material to be screened) to a sieve surface of a sieving system, b) agitating (e.g. vibrating and/or tumbling) the sieve surface and dividing the material to be screened into (1) a divided fraction (acceptable size material or material passing through the sieve) and (2) an oversize portion or fraction (sieve surface tailings), c) during the dividing step (step b), flushing the agitated sieve surface with an air flow, generally perpendicular to the sieve surface, which air flow is applied from below the sieve surface (preferably from at least one slotted nozzle), d) discharging the oversize fraction from the sieving system (this fraction can be ground and circulated back to the applying or feeding step and hence is also referred to as the "circulating portion"), and e) discharging (or recovering) the finely divided fraction.

The flushing step (step c) is extremely important, because it inhibits blinding (clogging or plugging) of the sieve surface. Even agitation of the sieve surface is not sufficient, by itself, to prevent blinding of the surface.

The apparatus for carrying out the process described above comprises:

a hopper for feeding said particulate cellulose material to a sieve surface, a sieve surface (optionally inclined to the horizontal) which has sieve openings for permitting finely divided cellulose material to pass through, means for agitating the sieve surface, at least one air nozzle arranged below the sieve surface for directing a flow of air in an upward direction, generally perpendicular to and through the sieve surface, and for flushing said sieve surface with air to inhibit plugging of the sieve openings in the sieve surface, means for permitting discharge (removal) of oversize particles, retained on said sieve surface, from said apparatus, and means for discharging (recovering) particles which pass through said sieve surface.

BRIEF DESCRIPTION OF THE DRAWING

In the accompanying Drawing, wherein like reference numerals denote like parts in the various views.

FIG. 2 is a perspective view of an alternative, less preferred form of apparatus of this invention.

DETAILED DESCRIPTION

Figure 1:
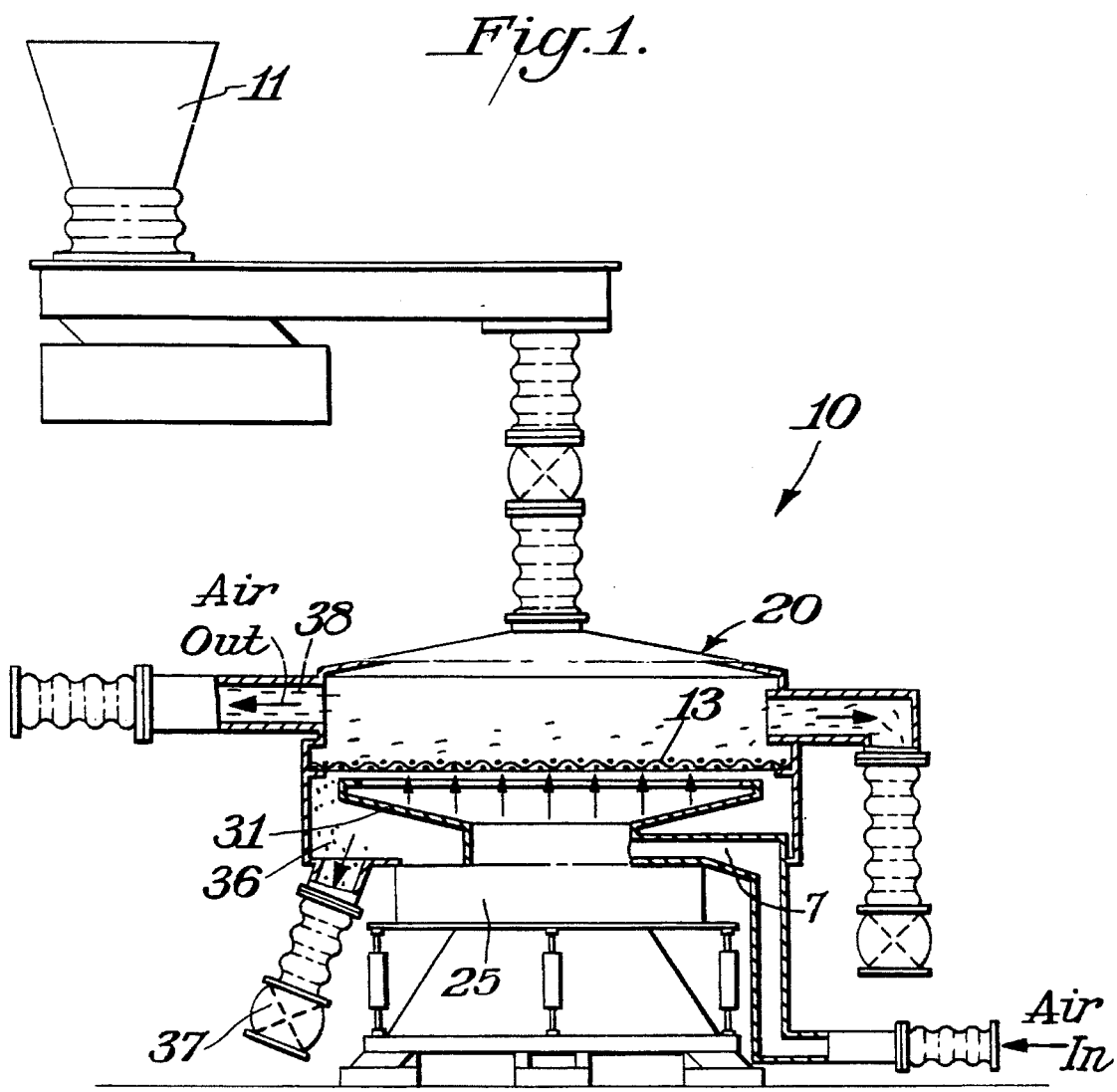
FIG. 1 is a side elevational view, with parts broken away, of a preferred form of apparatus of this invention.

The cellulose ethers used in the process according to the invention have a finely fibrous or wad-like or woolly structure. After mill-drying or grinding, microscopic inspection of the resulting material shows a particulate cellulose ether with spherical shapes in addition to elongated fibers or particles having hook-like outgrowths which are relatively short by comparison to the length of these fibers or particles.

The term "highly viscous cellulose ethers" refers to those cellulose ethers whose viscosity (measured as a 1.9% strength by weight aqueous solution) is 30,000 to 300,000 mPa.s.

The term "highly substituted cellulose ethers" refers to those cellulose ethers whose molecular degree of substitution (MS value) is between 0.05 and 0.8 and whose mean degree of substitution (DS value) is between 1.3 and 2.1.

The term "generally perpendicular to the sieve surface", refers to a direction, particularly a direction of air flow, which is at or close to 90° relative to the plane of the sieve surface; by a direction of air flow "close" to 90° is meant a direction (e.g. 85° to 95°), which will achieve flushing and inhibit clogging or plugging of the sieve surface. It should be understood that the direction of air flow need not be static and can vary with time, e.g. by agitating one or more air nozzles placed under the sieve surface.

With the aid of the process according to the invention it is possible to set the particle size distribution specifically. The preferred particle size distributions are between 200 and 30 μm, particularly preferably between 180 and 63 μm, and are set by the mesh width of the sieve cloth.

The bulk densities of the cellulose ethers screened out by the process according to the invention are between 200 and 600 g/l, preferably between 250 and 450 g/l.

The flowability of the cellulose ethers screened out by the process according to the invention is between 50 and 200 cm³/s, preferably between 60 and 140 cm³/s (determined as specified in DIN 53492).

The above-described cellulose ethers are first applied or fed to the sieve surface. Generally, feeding devices known for this purpose to those skilled in the art, such as a spreading screw or feed hopper, are used. During this feeding, the sieve surface is in the stationary state or preferably in an agitated (e.g. vibrating and/or tumbling) state described in more detail subsequently.

The amount of cellulose ether applied to the sieve surface per unit of time (sieve surface loading) is dependent on the product structure and on the chosen mesh width of the sieve. Sieve cloths having a mesh width of 250 to 63 μm are preferably used.

With the aid of the process according to the invention it is possible to increase the specific sieve surface loading, in comparison to screening processes known hitherto, with screen efficiency remaining constant.

To achieve cellulose ethers conforming to specifications in all particle size ranges, the sieve cloth used is chosen with respect to mesh width in such a way that on the one hand a minimum of undesired coarse material is achieved in the finely divided or undersize portion or fraction (material passing through the sieve), such a finely divided portion being termed acceptable size material below, and on the other hand only a minimum of fine material is contained in the oversize or tailings portion.

After application of the above-described cellulose ether (material to be screened), the material to be screened is divided by means of an agitated—preferably vibrating and/or tumbling—sieve surface into a undersize portion, which predominantly comprises fine material and small amounts of coarse material, and the tailings portion, which predominantly comprises coarse material and small amounts of fine material.

The term "coarse material" refers to the cellulose ether particles whose particle size is greater than the screen aperture of a defined test sieve. The term "fine material" refers to the cellulose ether particles whose particle size is smaller than the screen aperture of a defined test sieve.

The acceptable size material usually has a coarse material content below 6% by weight. The content of fine material in the oversize material is dependent on the sieve surface loading, separation limit and on the screen efficiency and sieving machine type and on the structure of the cellulose ether particles.

To divide the material to be screened by means of a sieve surface it is necessary agitate the sieve surface, i.e. to set the sieve surface in motion. Vibration motion is a particularly preferred type of motion. In order to achieve the desired sieving effect with the aid of vibration, the vibration frequency, determinations are made with respect to the vibration amplitude and the angle of inclination of the sieve surface to the horizontal, and the sieving system is set accordingly. The vibration frequency and the vibration amplitude of the sieve surface are generally set by electromagnetic vibrating heads in a frequency range from 5 to 100 Hz, preferably 30 to 60 Hz (hertz). The vibration amplitude is set in a range from 0.3 to 4 mm, preferably 0.3 to 1.2 mm.

Furthermore, the angle of inclination of the vibrating sieve surface to the horizontal can be set in a range from 30° to 60° so that by means of the above-described process parameters a residence time necessary for division of the material to be screened can be established on the sieve surface.

Tumbling is another preferred type of motion. To divide the material to be screened by means of a tumbling sieve surface it is necessary to set the sieve surface in a tumbling motion. In order to achieve the desired tumbling motion (circular motion), in addition to the speed of rotation of the sieve surface, the desired tangential and radial angles of inclination of the sieve surface are determined and set.

The preferred speed of rotation of the sieve surface is 180 to 240 revolutions per minute, the preferred tangential angle of inclination is 1° to 5°, and the preferred radial angle of inclination is 5° to 10°.

The vibrating and/or tumbling sieve surface is flushed through from below generally perpendicularly to the sieve surface by an air flow in such a way that blinding (clogging or plugging) of the sieve surface can be effectively prevented or inhibited. The air throughput for this is preferably 3 to 8 m³/m²min, in particular 4 to 7 m³/m²min. Outlet orifices which are suitable are in particular slot nozzles mounted beneath the sieve surface which preferably rotate at 1 to 10, in particular 2 to 8 revolutions per minute.

As a result of the abovementioned measures, blinding (clogging or plugging) of the sieve cloth by limit size material (plugging material) or matting is prevented, enabling a constantly high specific throughput (=specific sieve surface loading).

The sieve surfaces used usually have a sieve width of 0.95 to 1.75 m and the sieve lengths are usually 1.45 to 5.4 m, which results in sieve areas of 1.38 to 18.9 m² by combination of the sieve widths and lengths.

According to one step of the process of this invention (step d), the oversize (circulating) portion or fraction is discharged from the sieving system. Discharging the circulating portion comprises removal from the sieving system as sieve surface tailings. These sieve surface tailings are preferably subjected to grinding so that they can be circulated back into the process, i.e. reapplied to the sieve surface (in accordance with process step a) as material to be screened and, in accordance with process step b, are again divided into a finely divided fraction and an oversize (tailings) fraction.

In process step e, the finely divided, screenable portion or fraction (acceptable size material) is discharged or recovered, either directly or indirectly, as the product of the process. When the finely divided fraction is considered acceptable size material without further screening, it is recovered directly, i.e. removed from the sieve device and fed in this form to a further processing operation (generally packaging). When the finely divided fraction is recovered indirectly, it is applied to a further sieve surface having a smaller mesh width (as compared to the mesh width used in process step a) and this material to be screened is again divided into acceptable size material and oversize material.

In one embodiment of the process according to the invention, more than two, preferably four, agitated sieve surfaces are connected in series analogously to the known two-decker sieving machine, the downstream sieve surface having a smaller mesh width than the upstream sieve surface.

The above-described process is suitable in particular as a continuous process for screening out finely pulverulent cellulose ethers which have a particle size <250 μm, preferably 1 to 250 μm, from cellulose ethers which have a finely fibrous or wad-like or woolly structure.

The process according to the invention can be carried out with the aid of known sieving devices.

Examples which may be mentioned of sieving devices operating with vibrating sieve surfaces are high performance sonic-type sieving machines. In this case the high performance sonic-type sieving machines are driven by electromagnetic vibration heads which are mounted externally on the sieve housing and are freely accessible. The excitation (vibration) of the sieve cloth is effected via shafts mounted below the sieve cloth which run transversely to the transport direction and carry beater bars. There is a plastic sheathing on the beating bars to protect the sieve cloth. The vibrations are imposed on the sieve cloth via strikers, striker heads, elbow levers and the beater bars. Sieve cloths and beater bars are only connected together by friction. In order to avoid transverse vibrations, the shafts are balanced and are mounted in bearings on the left and right outside the unit.

The cloth is tensioned in the sieving unit via tension folds, tensioning bars being arranged on the product inlet side which enable automatic retensioning and rapid replacement.

The complete sieving machine usually comprises the sieving unit with cover, the bottom hopper, if appropriate a pivoting hopper and an electric controller. The sieving unit generally comprises a sieve cloth having tension folds and tensioning bars, drive elements and a feed hopper.

Examples which may be mentioned of sieving devices operating with tumbling sieve surfaces are tumble sieving machines.

In this case the sieving box, which is usually round, is set in a tumbling motion by a rigid crank drive. This is effected by means of a variable-angle crank pin. The circular motion in this case has a superimposed vertical motion so that a tumbling motion results which depends on the parameters speed of rotation, eccentricity of the crank, and radial and tangential inclination. The design of the tumble sieving machines permits all parameters to be changed steplessly so that optimal separation and screen efficiency is possible.

The vibration width and thus the acceleration vary by adjusting the crank cam, the crank pin inclination in the tangential direction controls the circular transport rate on the screen surface, the inclination of the crank in the radial direction determines the transport motion from the center of the sieve surface to the rim. The interaction of the tangential and radial inclinations results in a spiral motion of the material to be screened on the sieve surface.

All tumble sieving machines can be equipped as single-, two-, three- or four-deckers, so that, depending on the chosen mesh width of the sieve cloth, up to 5 fractions can be screened out.

To evaluate whether the sieving system is suitable for screening cellulose ethers, the separation efficiency $$\text{separation efficiency} = \frac{\text{fraction of fine material in the portion of material passing through the sieve}}{\text{fraction of fine material in the feed}} \times 100 [\%]$$

and the screen efficiency $$\text{screen efficiency} = \frac{(a-g) \times (f-a) \times 100}{(100-a) \times (f-g) \times a} \times 100 [\%]$$

are used, in which g denotes the fraction of fine material in the material retained by the sieve in (%), f denotes the fraction of fine material in the material passing through the sieve in (%) and a denotes the fraction of fine material in the cellulose ether feed in (%).

The separation limit is taken to mean here the desired upper limit of particle size in the acceptable size material; it is determined with the aid of an Alpine air jet sieve. The sample weight is 10 g, the screening duration is 3 minutes.

Flowability was determined as specified in DIN 53492 and the bulk density was determined as specified in DIN 53466.

Turning now to the Drawing, FIG. 1 illustrates a preferred, remarkably straightforward form of apparatus for carrying out the process of this invention. The apparatus 10 comprises a feed hopper 11, which feeds the raw particulate mass (containing elongated or fibrous particles which are difficult to screen) to a sieving unit 20 having a sieve surface 13, below which are rotating slotted nozzles 31 providing a generally upwardly directed air flow (i.e. generally against gravity) which flushes sieve surface 13 from below and prevents blinding of the sieve. Nozzles 31 are fed with air from incoming air supply 7. Oversize material 38 is discharged from the sieving unit 20, along with outgoing air, and acceptable size material 36 is discharged or recovered via outlet 37. A vibrator 25 imparts vibrational motion to the sieving unit 20.

FIG. 2 illustrates a sieving/collection apparatus 10A comprising a feed hopper 11; a sieving unit or system 20; sieve surfaces 13 and 15, which are placed in rotational motion by shaft 17, the rotation of shaft 17 being provided by crank 19 and motor 21; beater bars 23 and 27 and vibrators 25 and 29, which impart further motion to sieve surfaces 13 and 15; slotted nozzles 31, which direct a flow of air (shown with upwardly-pointing arrows) in a generally upward direction, generally perpendicular to the planes of the sieve surfaces 13 and 15 (nozzles 31 being fed by air supply 7); a motor and rotational drive 33, which rotates the slotted nozzles 31; and collector 35 for collecting finely divided material passing through the lower sieve surface 15, which is provided with a chute 37 for discharging acceptable size cellulose ether particles 36 to a further processing operation such as packaging (not shown).

The bottom end of the outer shell 39 of sieving unit or system 20 collects oversize material and material thrown off of sieve surfaces 13 and 15 by inertial or centrifugal forces or otherwise discharged from surfaces 13 and 15. As indicated previously, this material collecting in the bottom of sieving unit or system 20 contains only a small amount of fine material and constitutes the sieve tailings 38. As shown in FIG. 2, the tailings can be subjected to a grinding step and circulated back to feed hopper 11.

The operation of apparatus 10 or 10A conforms generally to the foregoing description of the process of this invention. Particulate cellulose ether material (which typically contains some fine material and some coarse material, the particles of which being in part generally spherical and in part elongated or fibrous) is fed by hopper 11 to sieve surface 13, preferably while sieve surface 13 is in motion, the motion being imparted (in the apparatus of FIG. 2) by drive shaft 17, beater bar 23, and vibrator Fine material passes through sieve surface 13 and is thereby fed to sieve surface 15 (FIG. 2), which is normally also in motion, the motion being imparted by the shaft 17 and beater bar 27. A slowly rotating, curtain-like flow of air from slotted nozzles 37 flushes sieve surfaces 13 (FIG. 1 and 2) and 15 (FIG. 2) from below, inhibiting or preventing the blinding of sieve surfaces 13 and 15. Fine material passing through sieve surface 15 is collected in collector 35 (FIG. 2), then passed on through chute or outlet 37 for further processing, as described above.

As shown in FIG. 2, sieve surfaces 13 and 15 are provided (by shaft 17) with a radial angle of inclination of 5° to 10°, 8° being shown, and surfaces 13 and 15 are further provided with a tangential angle of inclination of 1° to 5°, 2° being shown. Moreover, as shown in FIG. 2, sieve surfaces 13 and 15 are inclined at an angle of 30° to the horizontal. These angles, the vibratory and rotational (and tumbling) motion, and the flow of air from nozzles 31 all combine to provide a relatively clean separation of fine material from oversize material (sieve tailings).

The following non-limiting Examples illustrate the principle and practice of this invention.

EXAMPLES

In Examples 1 and 2 described below, the material to be screened is divided into acceptable size material and oversize material with the aid of a tumbling sieve.

Example 1

A methylhydroxyethylcellulose (MHEC) prepared by known processes having a degree of etherification of DS=1.56 ($OCH_3$), an MS=0.29 ($OC_2H_4$) and a viscosity of >300,000 mPas as a 1.9% strength aqueous solution was purified, dried and ground. The bulk density of the ground material was determined to be 310 g/l. The material to be screened had no flowability as specified in DIN 53492. The following sieve analysis was determined:

| Particle diameter mm | % by weight |
| --- | --- |
| <0.300 | 99.4 |
| <0.200 | 95.5 |
| <0.180 | 93.1 |
| <0.125 | 83.0 |
| <0.100 | 75.0 |
| <0.071 | 64.9 |
| <0.063 | 45.6 |
| <0.032 | 7.9 |

This ground material was used for screening by the process according to the invention and for the comparison examples.

a) Separation limit at 0.180 mm

The sieving machine had the following settings in the process according to the invention (cf. FIG. 1):

Four rotating slot nozzles having an air throughput of 6.53 $m^3/m^2$min and a speed of rotation of 4 rpm. The circular motion of the screen surface was 210 rpm. The tangential tilt of the screen surface was 2° and the radial tilt was 6°.

The sieve cloth had a mesh width of 0.250 mm. The specific sieve surface loading was 207.8 $kg/m^2h$.

The screening showed the following sieve analysis:

| Particle size | Passing through the sieve | Retained by the sieve | Bulk density | Flowability |
| --- | --- | --- | --- | --- |
| >0.18 mm | 1.14% by weight | 95.1% by weight | | |
| <0.18 mm | 98.86% by weight | 4.9% by weight | 334 | $VR_{25}$ = 90–130 |

The separation efficiency achieved in the screening was 99.9% and the screen efficiency was 84.17%.

Comparison Examples

| Sieve (type) | Specific surface loading $kg/m^2h$ | Separation efficiency % | Screen efficiency % | Bulk density |
| --- | --- | --- | --- | --- |
| Passing sieve | 62 | 77.1 | 76.75 | 334 |
| Gyratory sifter | 39.04 | 98.8 | 66.71 | 250 | b) Separation limit at 0.125 mm

The sieve cloth had a mesh width of 0.150 mm. The specific surface loading was 244.4 $kg/m^2h$.

The screening showed the following sieve analysis:

| Particle size | Passing through the sieve | Retained by the sieve | Bulk density | Flowability |
| --- | --- | --- | --- | --- |
| >0.125 mm | 3.55% by weight | 75.8% by weight | | |
| <0.125 mm | 96.45% by weight | 24.2% by weight | 336 | $VR_{25}$ = 60–100 |

The separation efficiency achieved in the screening was 94.57% and the screen efficiency was 77.5%.

Comparison Examples

| Sieve (type) | Specific surface loading kg/m²h | Separation efficiency % | Screen efficiency % | Bulk density |
|---|---|---|---|---|
| Passing sieve | 82.55 | 70.03 | 70.03 | 346 |
| Tumbling sieve* | 70.00 | 74.5 | 66.22 | 334 |

[*without air jet cleaning]

c) Separation limit at 0.100 mm

The sieve cloth had a mesh width of 0.120 mm. The specific sieve surface loading was 244.4 kg/m²h.

The screening showed the following sieve analysis:

| Particle size | Passing through the sieve | Retained by the sieve | Bulk density | Flowability |
|---|---|---|---|---|
| >0.10 mm | 4.7% by weight | 69.94% by weight | | |
| <0.10 mm | 95.4% by weight | 30.06% by weight | 382 | $VR_{25} = 131$ |

The separation efficiency achieved in the screening was 87.47% and the screen efficiency was 74.83%.

Comparison Examples

| Sieve (type) | Specific surface loading kg/m²h | Separation efficiency % | Screen efficiency % | Bulk density |
|---|---|---|---|---|
| Passing sieve | 82.55 | 70.03 | 70.03 | 346 |

Example 2

A methylhydroxypropylcellulose (MHPC) prepared by known processes having a degree of etherification of DS=1.32 ($OCH_3$), an MS=0.25 ($OC_3H_6$) and a viscosity of 90,000 mPas as a 1.9% strength aqueous solution was purified, dried and ground. The bulk density of the ground material was determined to be 345 g/l. The material to be screened had a flowability of $VR_{25}$=108 cm³/s.

The following sieve analysis was determined:

| Particle diameter mm | % by weight |
|---|---|
| <0.300 | 99.6 |
| <0.200 | 97.1 |
| <0.180 | 95.4 |
| <0.125 | 87.5 |
| <0.100 | 79.8 |
| <0.071 | 67.3 |
| <0.063 | 42.8 |
| <0.032 | 8.0 |

This ground material was used for the screenings according to the invention and for the comparison examples.

a) Separation limit at 0.180 mm

The sieving machine had the following settings in the process according to the invention (cf. FIG. 1):

Four rotating slot nozzles having an air throughput of 6.53 m³/m²min and a speed of rotation of 4 rpm. The circular motion of the screen surface was 210 rpm. The tangential tilt of the screen surface was 2° and the radial tilt was 6°.

The sieve cloth had a mesh width of 0.250 mm. The specific sieve surface loading was 244.4 kg/m²h.

The screening showed the following sieve analysis:

| Particle size | Passing through the sieve | Retained by the sieve | Bulk density | Flowability |
|---|---|---|---|---|
| >0.180 mm | 1.72% by weight | 97.7% by weight | | |
| <0.180 mm | 98.28% by weight | 2.3% by weight | 450 | $VR_{25} = 100–140$ |

The separation efficiency achieved in the screening was 99.9% and the screen efficiency was 63.6%.

Comparison Examples

| Sieve (type) | Specific surface loading kg/m²h | Separation efficiency % | Screen efficiency % | Bulk density |
|---|---|---|---|---|
| Passing sieve | 55.18 | 59.51 | 58.58 | 345 | b) Separation limit at 0.125 mm

The sieve cloth had a mesh width of 0.150 mm. The specific surface loading was 244.4 kg/m²h.

The screening showed the following sieve analysis:

| Particle size | Passing through the sieve | Retained by the sieve | Bulk density | Flowability |
|---|---|---|---|---|
| >0.125 mm | 1.76% by weight | 53.22% by weight | | |
| <0.125 mm | 98.24% by weight | 46.78% by weight | 450 | $VR_{25} = 60–100$ |

The separation efficiency achieved in the screening was 88.9% and the screen efficiency was 77.7%.

Comparison Examples

| Sieve (type) | Specific surface loading kg/m²h | Separation efficiency % | Screen efficiency % | Bulk density |
|---|---|---|---|---|
| Passing sieve | 79.27 | 49.9 | 49.9 | 402 |
| Tumbling sieve* | 227.22 | 80.08 | 61.97 | 370 |

[*without air jet cleaning]

c) Separation limit at 0.100 mm

The sieve cloth had a mesh width of 0.120 mm. The specific sieve surface loading was 244.4 kg/m²h.

The screening showed the following sieve analysis:

| Particle size | Passing through the sieve | Retained by the sieve | Bulk density | Flowability |
|---|---|---|---|---|
| >0.100 mm | 3.2% by weight | 72.13% by weight | | |
| <0.100 mm | 96.8% by weight | 27.87% by weight | 450 | $VR_{25} = 60–80$ |

The separation efficiency achieved in the screening was 91.38% and the screen efficiency was 79.5%.

Comparison Examples

| Sieve (type) | Specific surface loading kg/m²h | Separation efficiency % | Screen efficiency % | Bulk density |
|---|---|---|---|---|
| Gyratory sifter | 57.50 | 76.3 | 74.66 | 335 |

What is claimed is:

1. A process for recovering finely divided cellulose ether particles from a particulate cellulose ether containing elongated or fibrous particles thereof cellulose ether having a finely fibrous or wad-like or woolly structure, comprising the following steps:
   a) applying a said particulate cellulose ether to a sieve surface of a sieving system,
   b) agitating the sieve surface and dividing said particulate cellulose ether into a first, finely divided fraction capable of passing through the sieve and a second, oversize fraction which remains on the sieve surface,
   c) during said step b, flushing said agitated sieve surface with an air flow, generally perpendicular to the sieve surface, which air flow is applied from below the sieve surface,
   d) discharging the second, oversize fraction from the sieving system, and
   e) discharging or recovering the first, finely divided fraction.

2. The process as claimed in claim 1, wherein said particulate cellulose ether comprises spherical particles and elongated particles or fibers having hook-like outgrowths.

3. The process as claimed in claim 1, wherein said sieving system comprises at least one additional agitated sieve surface of lesser mesh width than the mesh width of the sieve surface of said step a, said additional agitated sieve surface being arranged downstream from the sieve surface of said step a.

4. The process as claimed in claim 3, wherein said finely divided fraction is recovered from finely divided cellulose ether particles passing through said additional agitated sieve surface.

5. The process as claimed in claim 1, wherein the oversize fraction discharged from the sieving system is subjected to a grinding step and circulated back to said step a.

6. The process as claimed in claim 1, wherein the air flow is directed generally perpendicularly to the agitated sieve surface from below by a plurality of slot nozzles.

7. The process as claimed in claim 1, wherein said agitated sieve surface is subjected to vibrational or tumbling motion or a combination of vibrational and tumbling motion, and wherein said sieve surface is agitated during said step a as well as said step b.

8. The process as claimed in claim 1, wherein said finely divided fraction recovered from said sieving system has a bulk density of 200 to 600 g/l.

9. The process as claimed in claim 1, wherein said finely divided fraction recovered from said sieving system has a viscosity of 30,000 to 300,000 mPas, measured as a 1.9% strength by weight aqueous solution.

10. The process as claimed in claim 1, wherein said finely divided fraction recovered from said sieving system has a molecular degree of substitution (MS value) between 0.05 and 0.8 and a mean degree of substitution (DS value) between 1.3 and 2.1.

11. The process as claimed in claim 1, wherein the angle of inclination of the agitated sieve surface to the horizontal is 30° to 50°.

12. The process as claimed in claim 7, wherein the agitated sieve surface is vibrated at a frequency of 5 to 100 hertz with an amplitude of 0.3 to 4 mm.

13. The process as claimed in claim 7, wherein the agitated sieve surface is caused to have a tumbling motion and has a speed of rotation of 180 to 240 revolutions per minute.

14. The process as claimed in claim 13, wherein the agitated sieve surface has a tangential angle of inclination of 1° to 5° and a radial angle of inclination of 5° to 10°.

15. The process as claimed in claim 1, wherein the air throughput of the air flow through the agitated sieve surface is 3 to 8 m³/m² min.

16. The process as claimed in claim 1, wherein the air flow exits from slot nozzles which rotate at a speed of rotation of 1 to 10 revolutions per minute.

* * * * *

UNITED STATES PATENT AND TRADEMARK OFFICE
CERTIFICATE OF CORRECTION

PATENT NO. : 5,589,589
DATED : December 31, 1996
INVENTOR(S) : Manfred Sponheimer, Guenther Welt and Manfred Ziegelmayer It is certified that error appears in the above-indentified patent and that said Letters Patent is hereby corrected as shown below:

In claim 1 (column 11, line 26) the word "thereof" should read --of--

Signed and Sealed this

Twenty-second Day of April, 1997

Attest:

BRUCE LEHMAN

*Commissioner of Patents and Trademarks*

*Attesting Officer*